US012761730B2

(12) United States Patent
Kawamata

(10) Patent No.: US 12,761,730 B2
(45) Date of Patent: Oct. 13, 2026

(54) CONTROL APPARATUS OF HEAD-MOUNTED DISPLAY, CONTROL METHOD OF HEAD-MOUNTED DISPLAY, AND NON-TRANSITORY COMPUTER READABLE MEDIUM

(71) Applicant: CANON KABUSHIKI KAISHA, Tokyo (JP)

(72) Inventor: Takumi Kawamata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/311,147

(22) Filed: Aug. 27, 2025

(65) Prior Publication Data

US 2026/0064198 A1 Mar. 5, 2026

(30) Foreign Application Priority Data

Sep. 2, 2024 (JP) ................................ 2024-150851

(51) Int. Cl.

| | |
|---|---|
| ***G06F 3/01*** | (2006.01) |
| ***G06F 21/32*** | (2013.01) |
| ***G06T 19/00*** | (2011.01) |
| ***G06V 40/10*** | (2022.01) |
| ***G06V 40/20*** | (2022.01) |
| ***G06V 40/60*** | (2022.01) |

(52) U.S. Cl.
CPC ............ *G06F 3/013* (2013.01); *G06T 19/006* (2013.01); *G06V 40/10* (2022.01); *G06V 40/28* (2022.01); *G06V 40/67* (2022.01); *G06F 21/32* (2013.01)

(58) Field of Classification Search
None
See application file for complete search history.

(56) References Cited

U.S. PATENT DOCUMENTS

| | | | | |
|---|---|---|---|---|
| 2014/0071041 | A1 | 3/2014 | Fujimaki | |
| 2014/0126782 | A1 | 5/2014 | Takai et al. | |
| 2025/0323911 | A1 * | 10/2025 | Wang ...................... | G06F 21/32 |

FOREIGN PATENT DOCUMENTS

| | | | |
|---|---|---|---|
| JP | 2014-092940 | A | 5/2014 |
| JP | 2024-032409 | A | 3/2024 |

* cited by examiner

*Primary Examiner* — Nicholas J Lee
(74) *Attorney, Agent, or Firm* — Venable LLP

(57) ABSTRACT

A control apparatus for a head-mounted display (HMD) according to the present disclosure includes an image sensor and a display, wherein the control apparatus is configured to give a motion instruction that prompts the wearer to perform a motion to be executed using a hand or finger, and in a case where it is determined that a plurality of hands detected from a captured image obtained by the image sensor are performing a motion according to the motion instruction, authenticate a hand performing a motion closest to a motion according to the motion instruction among the plurality of hands as a hand of the wearer.

17 Claims, 18 Drawing Sheets

CONTROL APPARATUS OF HEAD-MOUNTED DISPLAY, CONTROL METHOD OF HEAD-MOUNTED DISPLAY, AND NON-TRANSITORY COMPUTER READABLE MEDIUM

BACKGROUND

Field of the Technology

The present disclosure relates to a technique for authenticating a hand of a head-mounted display (HMD) wearer included in a field of view of the HMD.

Description of the Related Art

There is mixed reality (MR) technology that merges real space and virtual space and allows an experiencer to interact with virtual objects. MR technology achieves interaction by synthesizing and presenting computer graphics (CG) representing virtual objects against real scenery and by expressing contact between real objects and virtual objects.

In MR technology, it is envisioned that a person can perform a gesture operation with his/her own hands to move virtual objects in real scenery. A gesture operation enables a CG object to be moved, manipulated, and the like without a controller. However, if there are a plurality of persons other than the experiencer in the same space, the experiencer may not be able to distinguish between his/her own hands and the hands of others and his/her own HMD may be unintentionally operated by the gesture operations of the hands of others.

Japanese Patent Laid-Open No. 2014-92940 and Japanese Patent Laid-Open No. 2024-32409 disclose techniques capable of preventing HMD operations by others. Japanese Patent Laid-Open No. 2014-92940 discloses a method for authenticating an HMD wearer by operating the HMD based on a determination pattern input by the HMD wearer. Japanese Patent Laid-Open No. 2024-32409 discloses a method for recognizing a hand of an HMD wearer based on a relationship between a position of the hand detected from an image photographed by the HMD and a position of a sensor device attached to the hand by the HMD wearer.

The conventional technique disclosed in Japanese Patent Laid-Open No. 2014-92940 described above can authenticate that the HMD wearer is a person authorized to use the HMD. However, since the technique does not grant a control right of the HMD to a hand used for authentication, the HMD can be operated by someone else's hand after authentication.

In addition, the conventional technique disclosed in Japanese Patent Laid-Open No. 2024-32409 can authenticate the HMD wearer by having the HMD wearer wear a sensor device. However, since sensor devices that accurately record and transmit device positions with respect to the HMD are expensive and must be carried with the HMD, a threshold for use of the sensor devices by users is high.

SUMMARY

The present disclosure has been made in consideration of the circumstances described above and an object thereof is to provide a technique that enables simple and secure authentication of a wearer's own hand from among hands included in a field of view of an HMD.

The present disclosure its first aspect provides a control apparatus of a head-mounted display (HMD) including: an image sensor configured to capture a field of view of a wearer; and a display configured to show an image to the wearer, wherein the control apparatus is configured to give a motion instruction that prompts the wearer to perform a motion to be executed using a hand or finger, and in a case where it is determined that a plurality of hands detected from a captured image obtained by the image sensor are performing a motion according to the motion instruction, authenticate a hand performing a motion closest to the motion instruction among the plurality of hands as a hand of the wearer.

Features of the present disclosure will become apparent from the following description of embodiments with reference to the attached drawings. The following description of embodiments is described by way of example.

DESCRIPTION OF THE EMBODIMENTS

Hereinafter, preferred embodiments of the present disclosure will be described in detail with reference to the accompanying drawings. It is to be understood that the embodiments described below merely represent examples of means of realizing the present disclosure and may be appropriately corrected or modified according to a configuration of an apparatus to which the present disclosure is applied as well as various conditions. In addition, the respective embodiments can also be combined as appropriate.

First Embodiment

Figure 1:
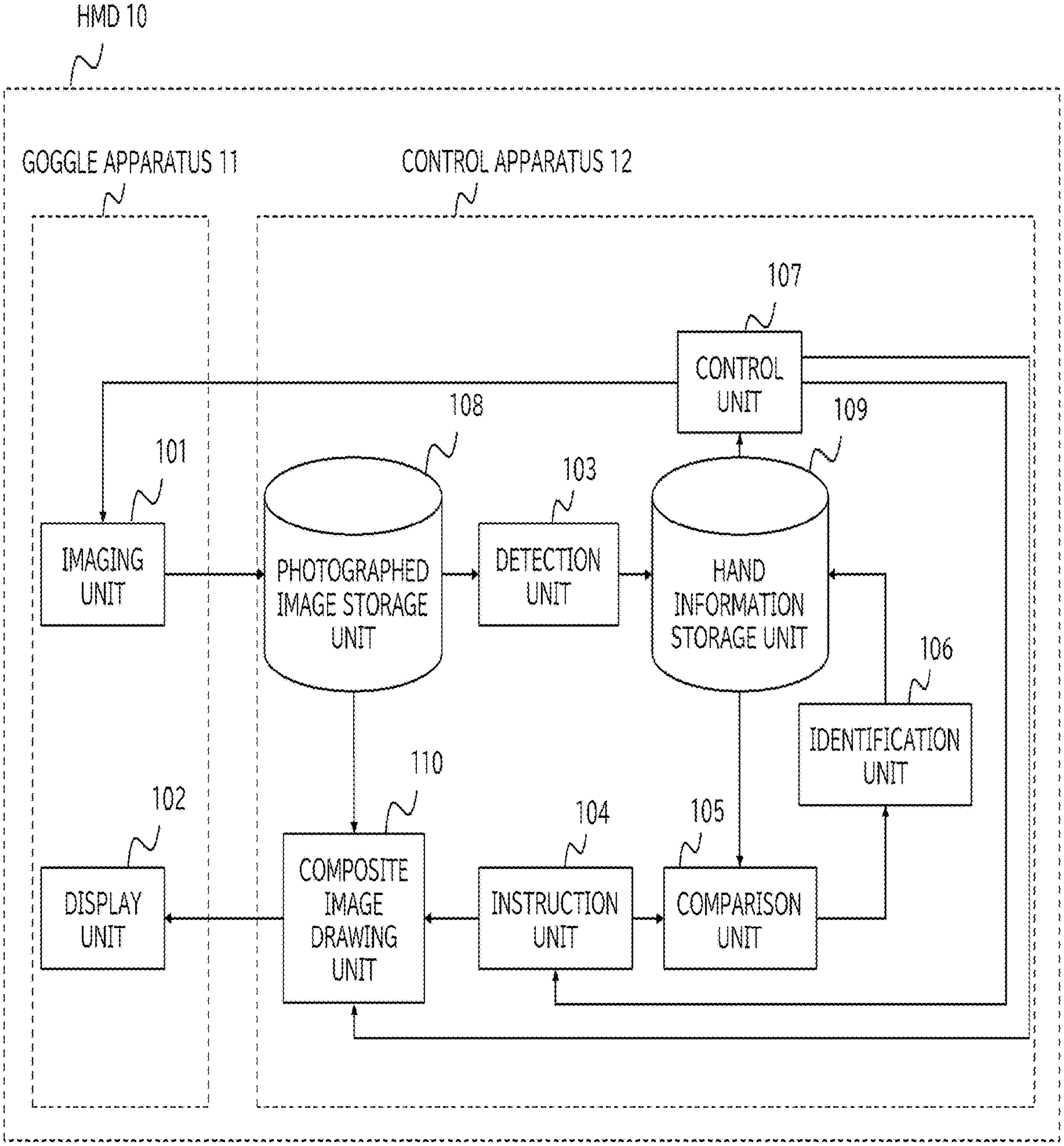
FIG. 1 shows a configuration of an HMD according to a first embodiment.

A configuration of an HMD according to the first embodiment will be described with reference to FIGS. 1 and 2. FIG.

1 is a block diagram showing a configuration of the HMD according to the first embodiment. FIG. 2 is a diagram showing the HMD in use.

An HMD 10 is a device to be worn on the head of a user and is constituted of a goggle apparatus 11 and a control apparatus 12. FIG. 2 schematically shows an example of how the HMD 10 is worn by the user. The goggle apparatus 11 at least has an imaging unit 101 and a display unit 102. The control apparatus 12 at least has a detection unit 103, an instruction unit 104, a comparison unit 105, an identification unit 106, a control unit 107, a photographed (captured) image storage unit 108, a hand information storage unit 109, and a composite image drawing unit 110. The control apparatus 12 is a small computer (information processing apparatus) that includes, as hardware resources, a CPU (processor), a memory, a storage, and a communication apparatus. Functions and processing of the control apparatus 12 to be described later are realized by deploying a program stored in a storage in a non-transitory manner in a memory and having the CPU execute the program. Note that a part of or all of the functions and processing of the control apparatus 12 may be replaced with a dedicated chip such as an FPGA or an ASIC or an external resource such as a cloud server or a smartphone may be used.

The goggle apparatus 11 of the HMD 10 is a head-mounted display apparatus.

Figure 2:
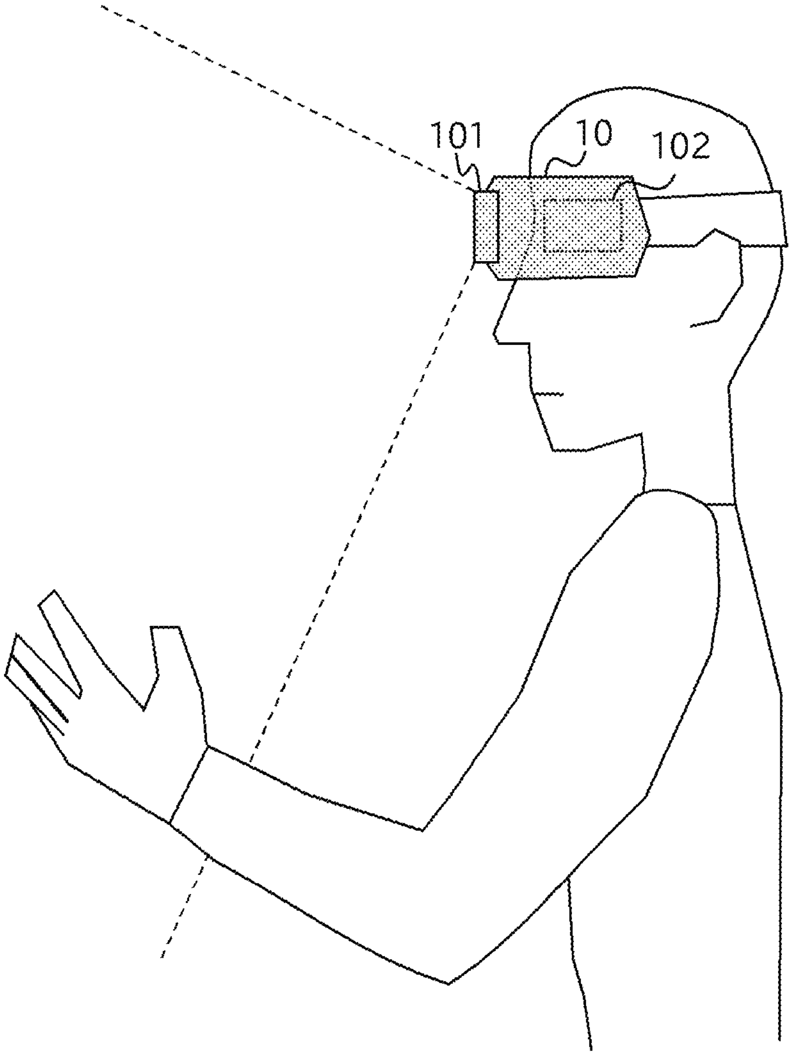
FIG. 2 shows the HMD in use.

As shown in FIG. 2, the HMD 10 according to the present embodiment adopts a video see-through system in which the imaging unit 101 is arranged at a viewpoint position of the user and a live-action video photographed (captured) by the imaging unit 101 is displayed on the display unit 102. In the case of the video see-through HMD 10, a method of treating the imaging unit 101 as a viewpoint position/posture of the user is generally adopted. While the HMD 10 according to the present embodiment adopts a video see-through system, it is to be understood that this is simply an example. For example, the present disclosure can also be applied to an HMD for virtual reality which does not display a live-action video on the display unit 102. In such a case, the imaging unit 101 may be used as a camera for photographing a hand as an object to be authenticated instead of a see-through camera.

The control apparatus 12 of the HMD 10 uses an image photographed by the imaging unit 101 to create composite image data to be displayed on the display unit 102. The control apparatus 12 may be incorporated into the same housing as the goggle apparatus 11 or may be constituted of a housing independent of the goggle apparatus 11. When the control apparatus 12 and the goggle apparatus 11 are constituted of independent housings, the control apparatus 12 and the goggle apparatus 11 are connected in a wired or wireless manner so as to be capable of communicating with each other.

The imaging unit 101 is fixed to the housing of the goggle apparatus 11 and is constituted of a sensor such as a CCD or a CMOS, a lens, and the like, and outputs an image obtained by photographing a subject to the photographed image storage unit 108. The imaging unit 101 can be configured to change photographing conditions (number of photographed pixels, photographing frequency (frame rate), and exposure settings) through settings.

The display unit 102 is fixed to the housing of the goggle apparatus 11 and is constituted of an organic EL display, a liquid crystal display, or the like, and displays a composite image generated by the composite image drawing unit 110. The composite image is, for example, an image for mixed reality (MR) in which digital contents (virtual objects) by 3DCG are composited on the photographed image acquired by the imaging unit 101. The display unit 102 is structured so as to cover a field of view of a user wearing the goggle apparatus 11 and provides a highly immersive MR experience for a user viewing the image.

The detection unit 103 detects a hand from a photographed image photographed by the imaging unit 101 through image recognition and calculates a three-dimensional position and posture of the hand and fingers as detected information. The detected information is stored in the hand information storage unit 109. In addition to the hand and fingers, the detected information may include information related to the arms, clothing, and accessories. Furthermore, in addition to the three-dimensional position and posture, the detected information may include information such as an angle, a size, a color, and a shape.

The instruction unit 104 generates a motion instruction based on an authentication request received from the control unit 107 and transmits the motion instruction to the composite image drawing unit 110. The motion instruction is an instruction that prompts the HMD wearer to execute a motion using a hand, a finger, or the like of the HMD wearer. In addition, the instruction unit 104 generates determination criteria (first feature amount) that are a feature amount quantifying the motion instruction and transmits the determination criteria to the comparison unit 105.

The comparison unit 105 compares the determination criteria (first feature amount) of the motion instruction received from the instruction unit 104 and the detected information (second feature amount) acquired from the hand information storage unit 109. At this point, the comparison unit 105 acquires detected information corresponding to the determination criteria (detected information to be compared with the determination criteria) from the plurality of pieces of detected information stored in the hand information storage unit 109. A comparison result is output to the identification unit 106.

On the basis of the comparison result acquired from the comparison unit 105, the identification unit 106 assigns an identifier to each piece of detection information stored in the hand information storage unit 109. As the identifier, in addition to a user identifier indicating that a person is an HMD wearer, a non-user identifier indicating that a person is not an HMD wearer may be assigned.

The control unit 107 refers to the hand information storage unit 109 and grants a control right to operate a user interface in a virtual space generated by the HMD 10 to the hand to which the user identifier is assigned. The control unit 107 accepts an operation of the user interface by the hand to which the control right is granted and controls each part of the HMD 10 according to the operation. In addition, the control unit 107 can also configure photographic settings with respect to the imaging unit 101, send an authentication request to the instruction unit 104, and configure display settings with respect to the composite image drawing unit 110.

The photographed image storage unit 108 stores a photographed image acquired by the imaging unit 101. The hand information storage unit 109 stores the detected information calculated by the detection unit 103 and the identifier generated by the identification unit 106.

The composite image drawing unit 110 composites a photographed image acquired from the photographed image storage unit 108 and the motion instruction generated by the instruction unit 104 and generates a composite image. In addition, the composite image drawing unit 110 applies the display settings configured by the control unit 107 to the composite image and outputs the composite image to the display unit 102.

Figure 3:
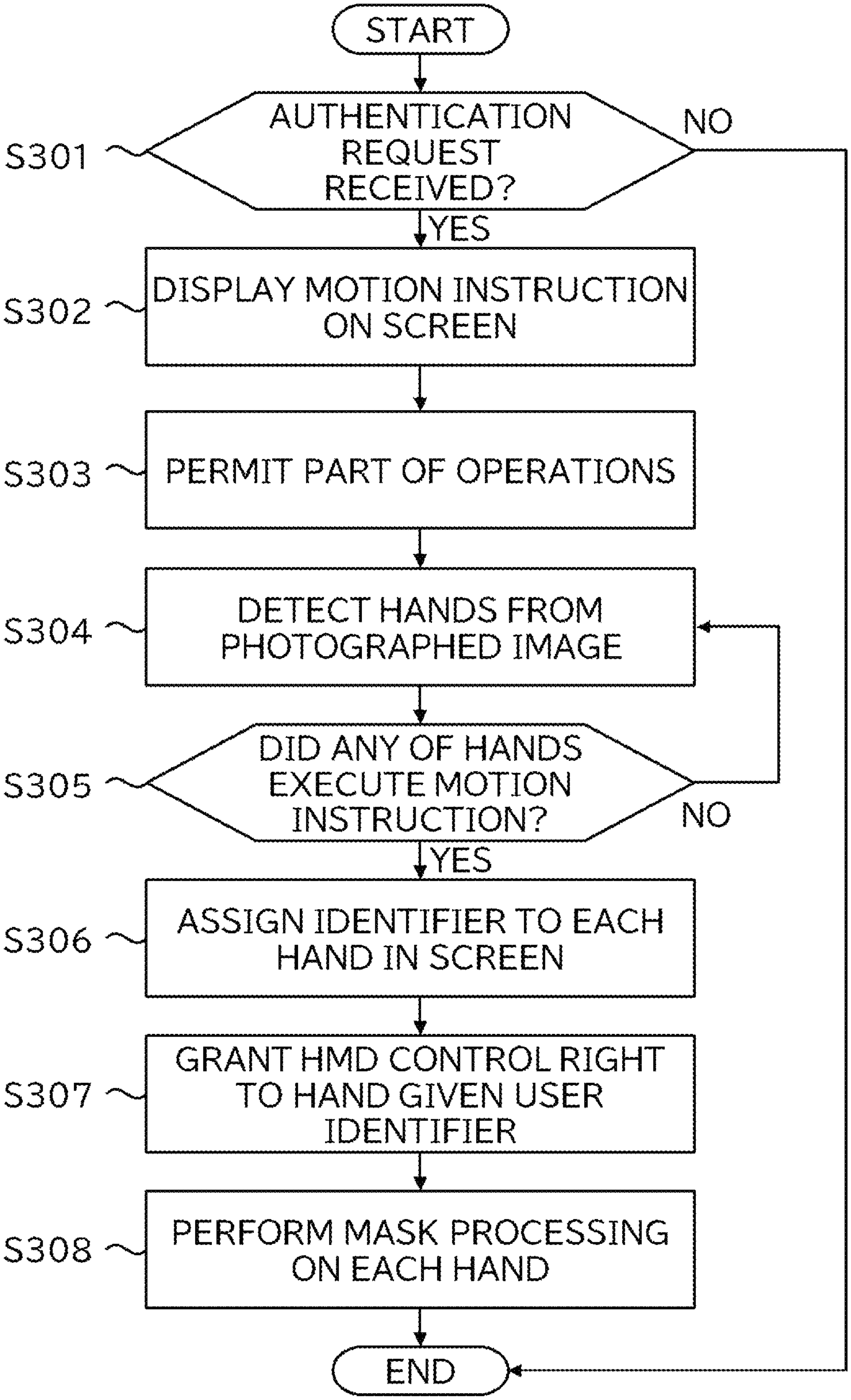
FIG. 3 is a flow chart of authentication processing of a hand of an HMD wearer according to the first embodiment.

FIG. 3 is a flow chart of authentication processing of a hand of an HMD wearer using a comparison between determination criteria and detected information according to the first embodiment.

In step S301, the instruction unit 104 determines whether or not an authentication request has been received. When an authentication request has been received, the flow advances to step S302, but if not, the flow is ended without further continuation. The instruction unit 104 receives an authentication request from the control unit 107 when an HMD wearer or software inside of the HMD 10 requires gesture authentication. Here, a case where the instruction unit 104 receives an authentication request during startup of the HMD 10 will be described.

In step S302, the instruction unit 104 generates an image of a motion instruction that prompts the HMD wearer to perform a predetermined motion, and the composite image drawing unit 110 composites the image of the motion instruction onto the photographed image and causes the display unit 102 to display the composite image.

Figure 4:
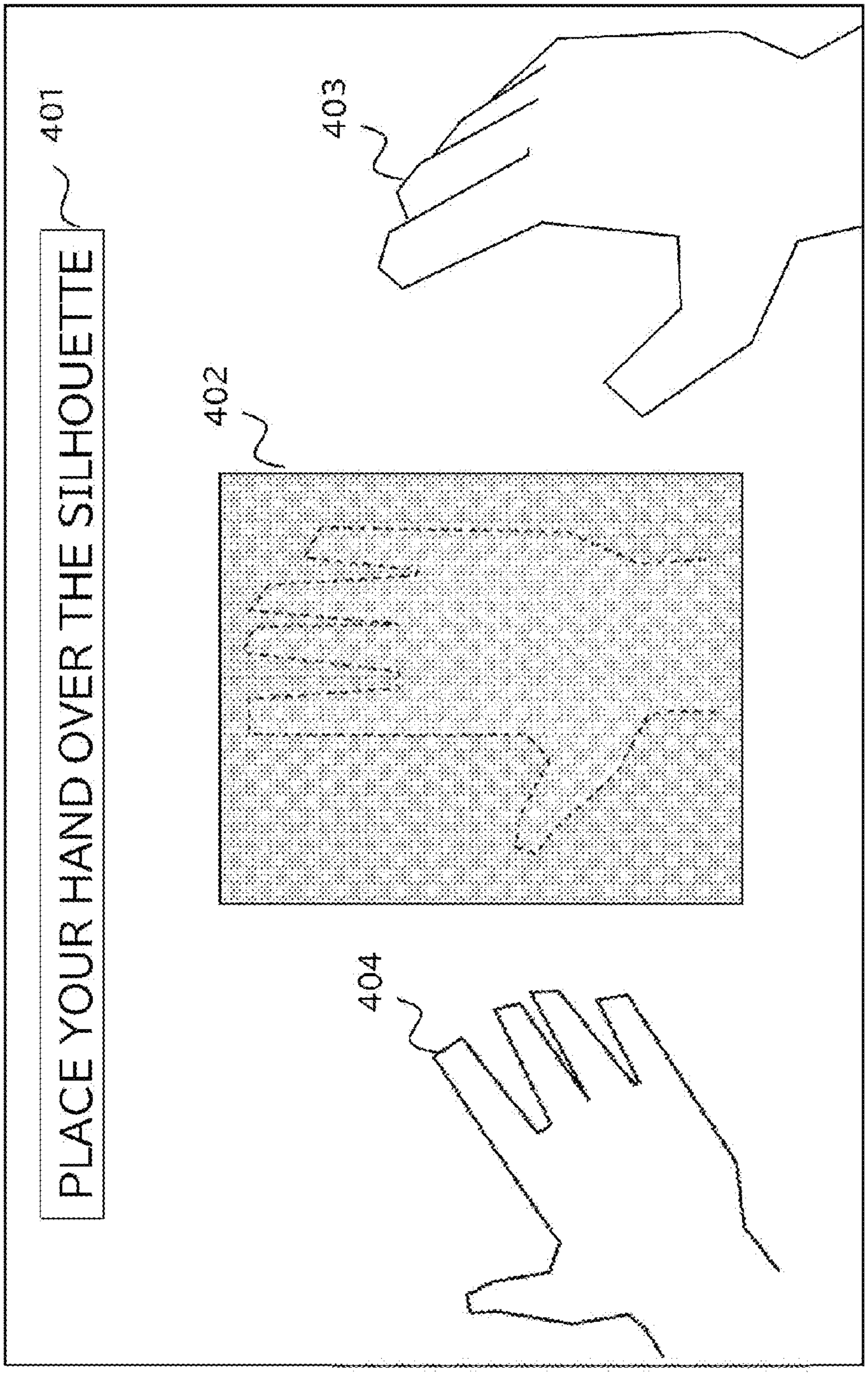
FIG. 4 shows a composite image when displaying a static gesture instruction.

For example, motion instructions include an instruction to make the HMD wearer express a designated shape using a hand or a finger, an instruction to move the hand or the finger to a designated position, and an instruction to make the designated shape at the designated position. Since all of these instructions are gestures in which the hand or finger stops in a designated shape or at a designated position, hereinafter, these motion instructions will be referred to as static gesture instructions. FIG. 4 shows an example of a composite image when displaying a static gesture instruction in which a text instruction 401 and an image instruction 402 are composited on a photographed image as motion instructions. The photographed image shows a hand 403 of the HMD wearer and a hand 404 of another person. The image instruction 402 is an image representation of a motion or a posture of the hand or the finger to be executed by the HMD wearer. The example in FIG. 4 is an image prompting a motion of moving the right hand to a position that overlaps with the silhouette and assuming a posture with all fingers spread apart.

Figure 5A:
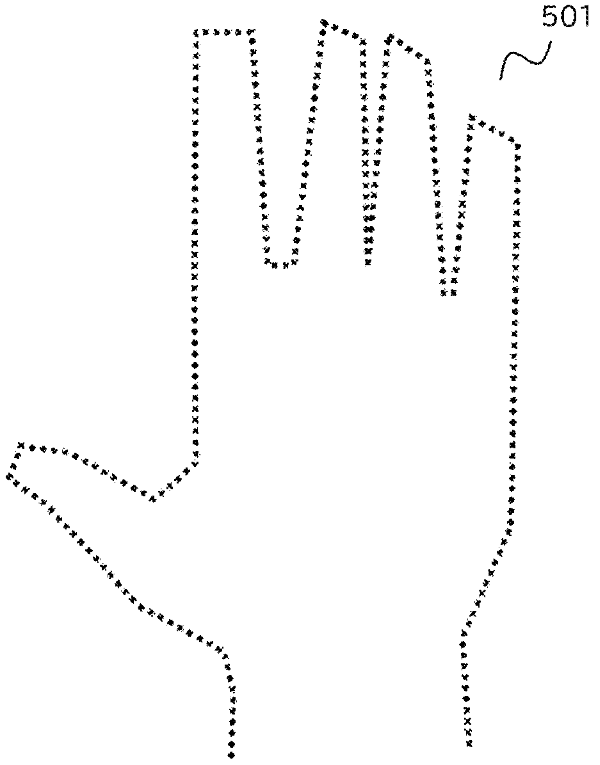
FIGS. 5A and 5B show a feature shape of a motion instruction in FIG. 4.
Figure 5B:
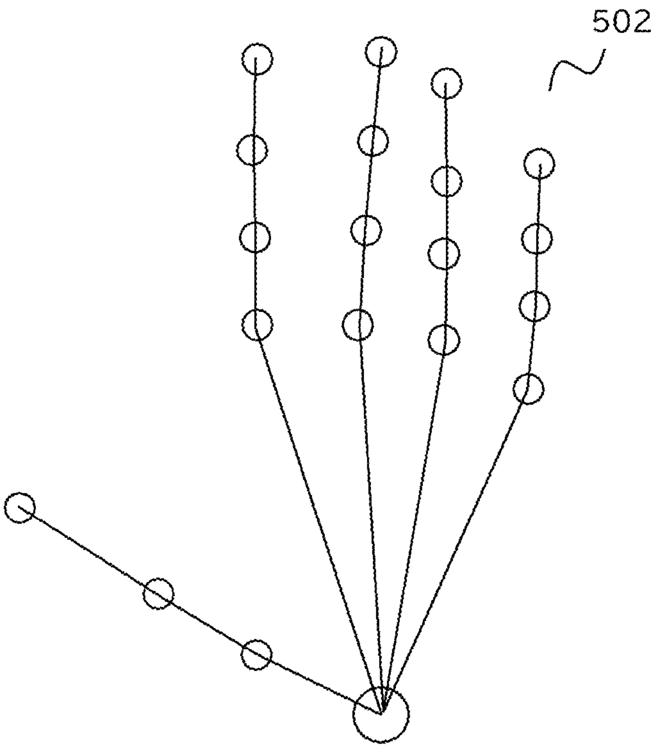
Figure 6:
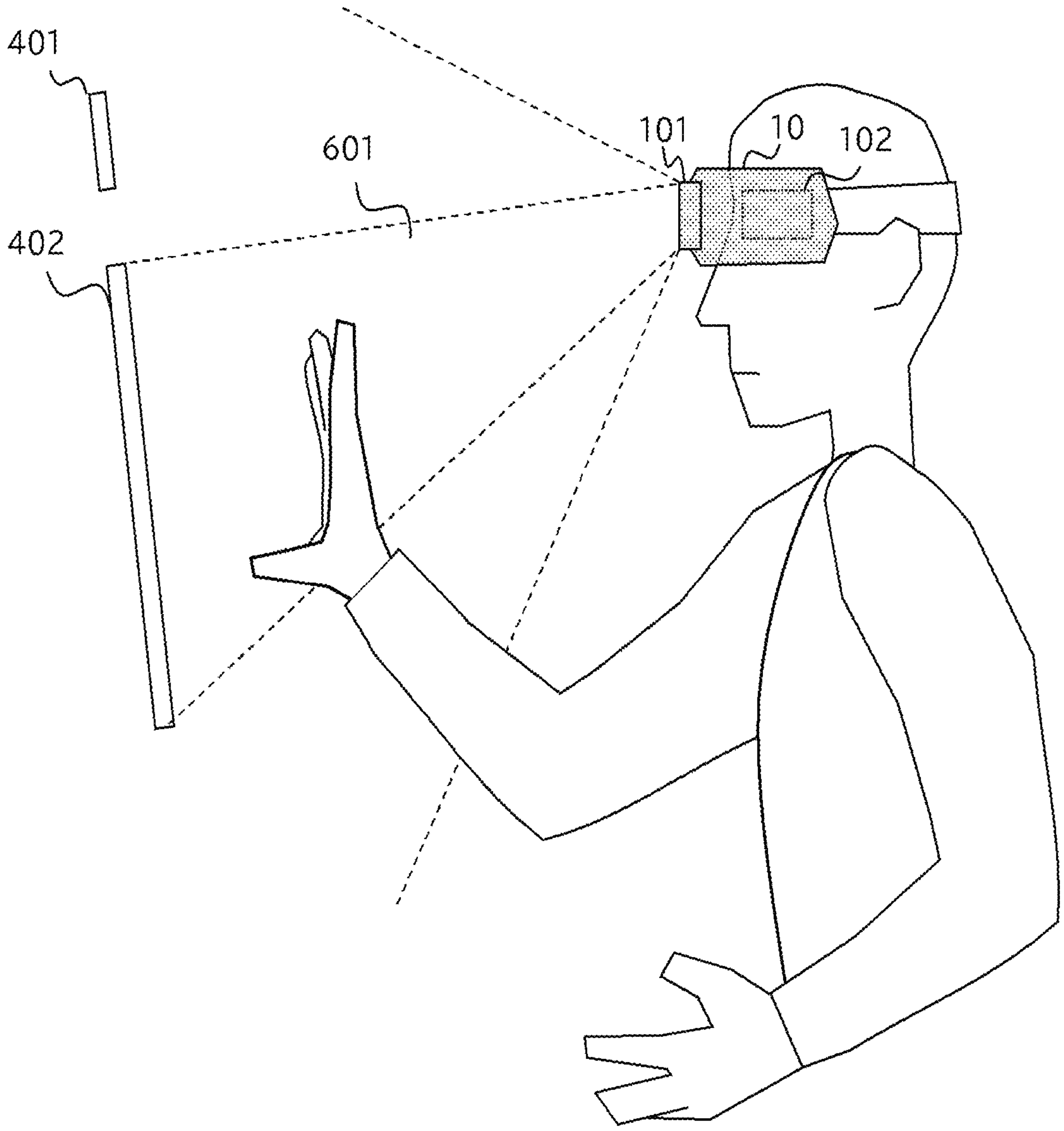
FIG. 6 shows a gesture execution position of the motion instruction in FIG. 4.

The instruction unit 104 generates a motion instruction and also generates determination criteria of the motion instruction, and delivers the determination criteria to the comparison unit 105. In the motion instruction in FIG. 4, for example, the two determination criteria are a feature shape expressed by the hand of the HMD wearer and an execution position. Conceivable feature shapes to be criteria include a point cloud 501 shown in FIG. 5A which follows a contour of the hand and fingers (also referred to as contour information) and a point cloud 502 shown in FIG. 5B which abstracts a shape of the hand and fingers (also referred to as skeletal information). In this case, whether or not a motion is correct can be determined from an amount of error by comparing either point cloud with a point cloud calculated from a hand detected in step S303 to be described later. Otherwise, correct and incorrect images may be prepared and a classification model may be created using classical machine learning. A conceivable execution position to be criteria is, as shown in FIG. 6, an area between the HMD 10 and the image instruction 402 (area 601) where the hand executing the gesture and the indicated silhouette overlap when viewed from the viewpoint of the HMD wearer.

In step S303, the control unit 107 permits a part of the operations of the HMD 10. When the HMD 10 has functions that should be prioritized due to the risk of misoperation such as an emergency call function or a volume control function, only such functions may conceivably be permitted. Once a part of the operations is permitted, the flow advances to step S304.

In step S304, the detection unit 103 performs detection of a hand and position/posture detection of the hand and fingers using the photographed image received from the imaging unit 101. Once the detection unit 103 detects a hand from the photographed image, the flow advances to step S305. As an algorithm for detecting a hand from an image, classical machine learning as typified by support vector machines may be used, a deep learning-based algorithm such as R-CNN, YOLO, SSD, or DCN may be used, or a rule-based detection algorithm may be used. Note that the control unit 107 may change photographing conditions (for example, the number of photographed pixels, a frame rate, exposure settings, and the like) of the imaging unit 101 when photographing an image for detecting hands according to a type of motion instruction so that detected information suitable for comparison processing in step S305 is obtained. For example, in a static gesture instruction, the frame rate that is a photographing frequency of the imaging unit 101 may be set to a low frame rate and the number of photographed pixels may be set to a high resolution so that positions and postures of the hand and fingers can be accurately detected. In addition, the positions and postures of the hand and fingers can be measured using Leap Motion manufactured by Leap Motion, Inc. There are also methods to create the positions and postures using deep learning or using existing publicly available libraries. Acquired detected information including an image of each hand and the positions and postures of the hands and fingers is stored in the hand information storage unit 109. When a plurality of hands are detected from inside of the photographed image (inside of the field of view of the HMD 10) as in the example shown in FIG. 4, detected information is acquired for each hand.

In step S305, the comparison unit 105 acquires the detected information of the hand detected from the photographed image by the detection unit 103 from the hand information storage unit 109 and determines whether or not the detected information matches determination criteria for motion instruction. When a plurality of hands are detected from the photographed image, the comparison unit 105 may compare the detected information of each hand with the determination criteria. When detected information of a hand that matches the determination criteria for motion instruction is found (in other words, when a hand having executed a motion in accordance with the motion instruction is detected), the flow advances to step S306, but otherwise the flow returns to step S304.

When comparing the determination criteria of the motion instruction with the detected information of the hand, the comparison unit 105 may transform data of the detected information or extract data from the detected information so as to match the determination criteria. Specifically, for example, the comparison unit 105 may extract contour information of the hand and fingers from the photographed image to be compared with the point cloud 501 or perform position/posture detection (skeleton detection) of the hand and fingers to be compared with the point cloud 502. Although the determination criteria and the detected information of a hand can be compared on the basis of as few as one image in static gesture instructions, a plurality of images may be used for comparison to increase accuracy. The timing for starting the comparison may be a certain amount of time after the still gesture instruction is displayed on the display unit 102 (the time it is expected to take for the HMD wearer to recognize the still gesture instruction and execute the motion: for example, tens to hundreds of milliseconds). Otherwise, for example, the comparison may be triggered by the fact that one of the hands detected by the detection unit 103 enters the area 601.

In step S306, based on a result of the comparison in step S305, the identification unit 106 considers the hand having performed the motion that is closest to (that best matches) the motion instruction to be the hand of the HMD wearer and assigns a user identifier to the detected information of the hand. This processing corresponds to processing of authenticating the hand of the HMD wearer. The user identifier assigned here is maintained until the detection unit 103 can no longer determine that the hand to which the user identifier is assigned is the same hand due to the hand moving out of an angle of view of the imaging unit 101 or being blocked by a shielding object. The user identifier is stored in the hand information storage unit 109 as a part of the detected information. Note that hands other than the hand determined to be the hand of the HMD wearer in step S305 (in other words, hands that have not performed a motion matching the motion instruction) are determined to be hands of other persons and non-user identifiers are assigned to detected information thereof. The non-user identifiers assigned at this point are to be used in step S308.

In step S307, the control unit 107 grants a control right of the HMD 10 to the hand to which the user identifier has been given. Subsequently, the control unit 107 is to detect or track the motion or posture of the hand to which the user identifier has been given (the authenticated hand) and accepts the motion or posture as an operation or a command input with respect to the HMD 10. Accordingly, only the HMD wearer can operate the user interface in a virtual space generated by the HMD 10. This completes the gesture authentication, and the HMD control right remains validated until the hand with the user identifier is no longer detectable. As long as the HMD control right remains validated, exclusivity control is enforced that prohibits operation by the hands of others. Note that the HMD control right is invalidated when the hand of the HMD wearer moves out of the angle of view of the imaging unit 101 or is blocked by a shielding object and the hand to which the user identifier is assigned can no longer be detected from a photographed image (in other words, when the HMD 10 loses sight of the hand to which the user identifier is assigned).

Figure 7:
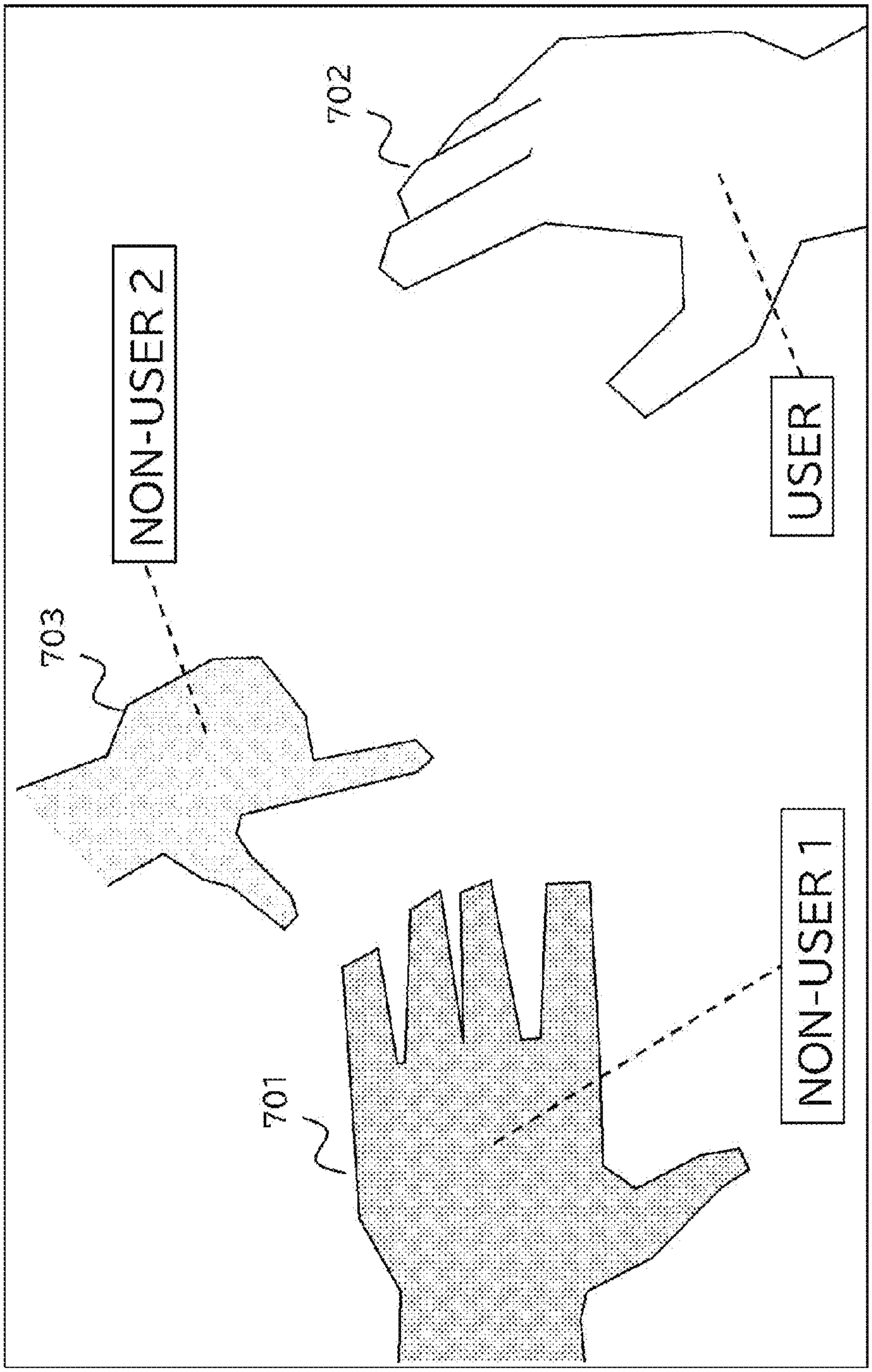
FIG. 7 shows a composite image of mask processing performed after gesture authentication.

In step S308, the control unit 107 performs mask processing to distinguish each hand with a color based on the user identifier or the non-user identifier. FIG. 7 shows an example of a composite image displayed on the display unit 102 of a state where mask processing is performed. Assigning different colors to hands 701 to 703 enables the HMD wearer to recognize that his/her own hand is distinguished from the hands of others in the HMD 10. In addition, the HMD wearer may also be assigned a specific color to indicate that he/she has been authenticated as the HMD wearer. Displaying an image in which a hand that has been authenticated as the hand of the HMD wearer is drawn in a mode that is distinguishable from the hands of others enables the HMD wearer to easily understand that his/her hand has been correctly authenticated.

Performing the series of steps S301 to S308 described above enables the hand of the HMD wearer to be authenticated when the HMD 10 is activated. According to the method of the present embodiment, since the HMD wearer need only manipulate the position and posture of the hands and fingers according to instructions, simple authentication can be achieved. Moreover, since gesture instructions are not visible to anyone other than the HMD wearer, no one other than the HMD wearer can execute gesture authentication. Therefore, secure authentication can be realized. In addition, since there is no need to use a sensor device or make advance preparations for personal authentication as is the case with conventional methods, the burden on users is small.

Second Embodiment

While the instruction unit 104 issues a static gesture instruction in step S302 in the first embodiment, motion instructions are not limited thereto. In the second embodiment, two other types of motion instructions generated by the instruction unit 104 will be exemplified. Note that a flow chart is similar to that of the first embodiment.

Figure 8:
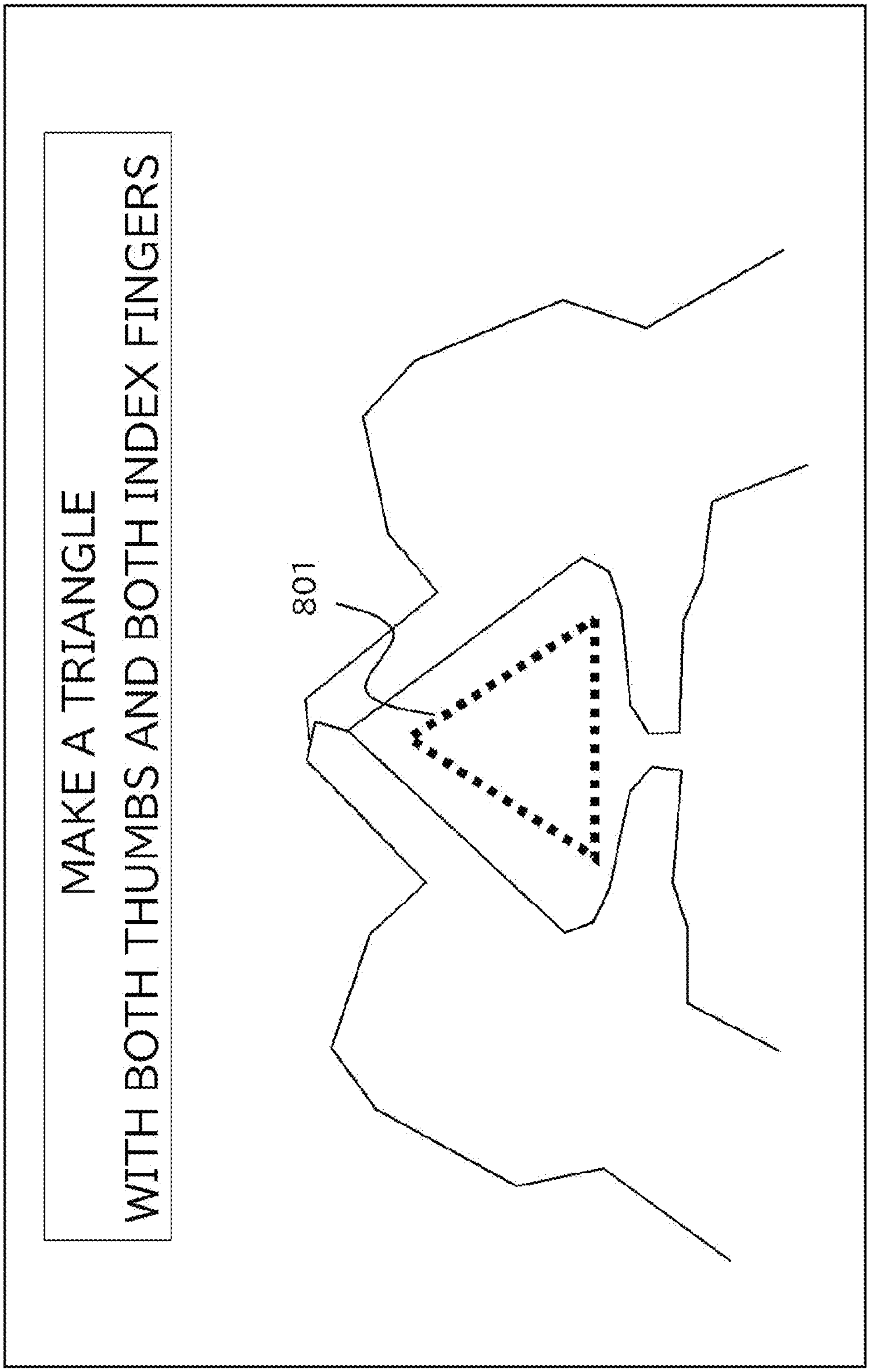
FIG. 8 shows a composite image when displaying a static gesture instruction to be executed with both hands.

The first motion instruction is a static gesture instruction to be executed with both hands. FIG. 8 shows a composite image made up of a triangle displayed in the screen of the display unit 102, a static gesture instruction to have the HMD wearer use both hands to express the triangle, and an image captured by the imaging unit 101 of both hands performing this gesture. Here, similar to the motion instruction exemplified in FIG. 4 described in the first embodiment, the motion instruction in FIG. 8 also has the same two determination criteria: feature shape and execution position. In this case, the feature shape to be criteria refers to, for example, a state where an angular relationship of a figure formed by the thumbs and index fingers is close to a triangle. In addition, the execution position to be criteria refers to, for example, a state where a center position of the figure formed by both hands fits inside of a figure instruction 801 when viewed from the HMD 10. Both hands that are determined by the comparison unit 105 to have executed this motion instruction are each assigned a user identifier by the identification unit 106, and each has an HMD control right given by the control unit 107. According to the present motion instruction, since both hands of the HMD wearer are assigned user identifiers, the HMD 10 can be controlled with either the left or right hand.

Figure 9:
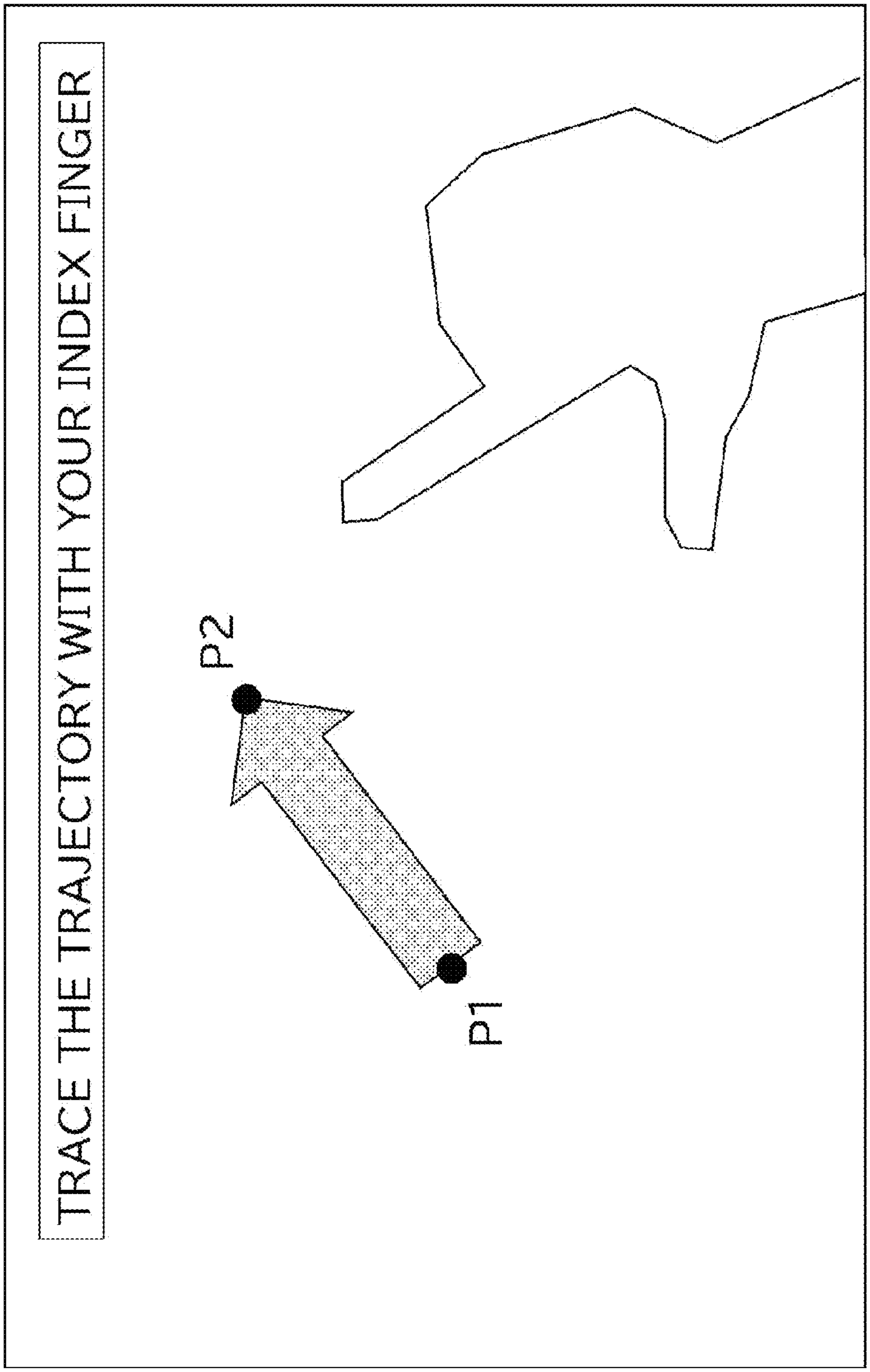
FIG. 9 shows a composite image when displaying a dynamic gesture instruction.
Figure 10:
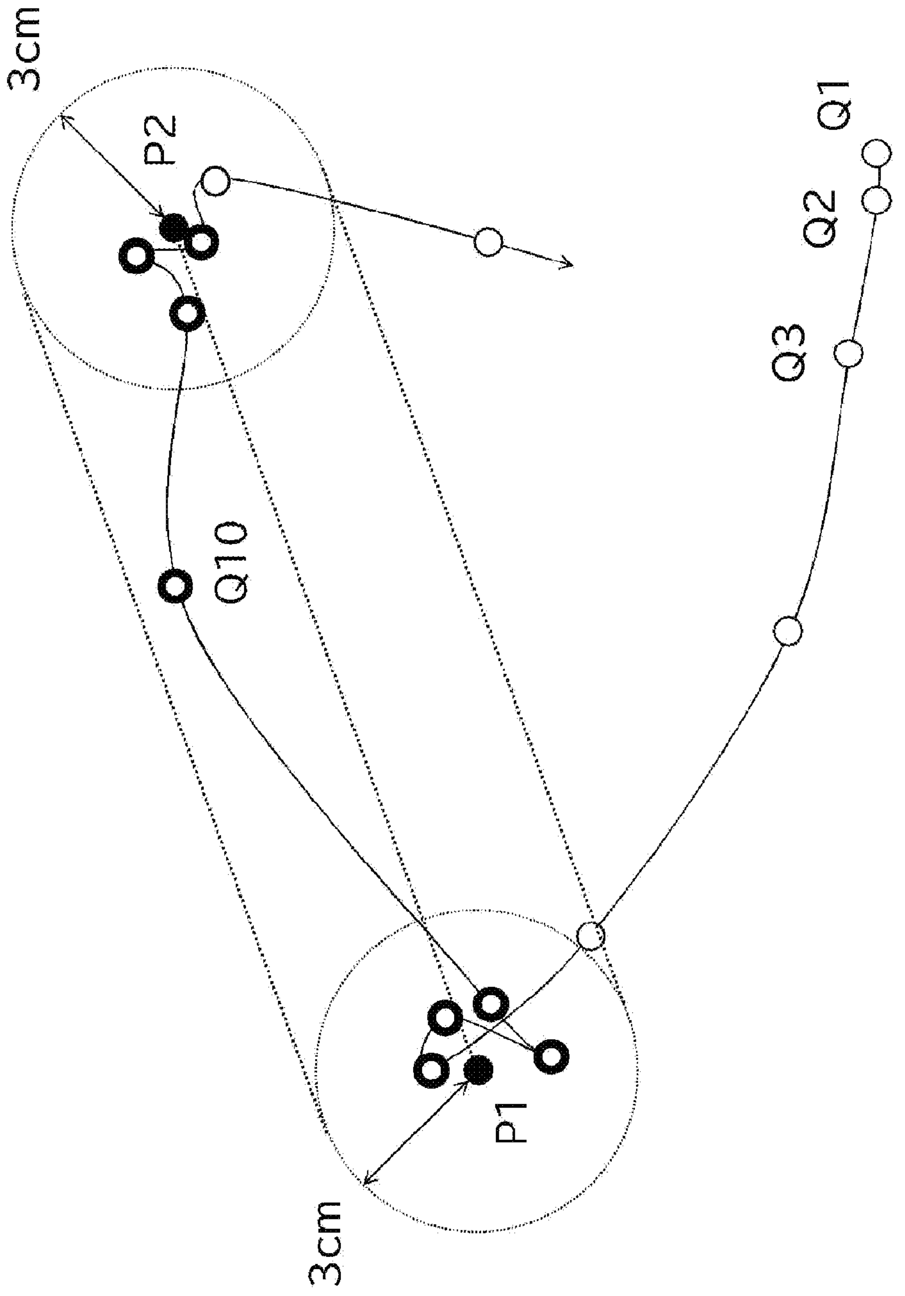
FIG. 10 is a schematic view of a position in a virtual space when performing the motion instruction in FIG. 9.

The second motion instruction is a dynamic gesture instruction that causes the HMD wearer to move a hand or a finger along a designated trajectory. In a dynamic gesture instruction, since a motion trajectory of the hand or the finger is compared with the designated trajectory, authentication is performed using a plurality of consecutive images instead of a single image. Therefore, in a dynamic gesture instruction, in order to increase the amount of data of positions of the hand or the finger relative to time to increase comparison accuracy, preferably, the control unit 107 sets photographing conditions with respect to the imaging unit 101 to increase a video frame rate of the imaging unit 101. FIG. 9 shows an example of a composite image of a dynamic gesture instruction that displays an arrow on the display unit 102 and causes the index finger to trace from a start point P1 to an end point P2 of the arrow and a hand of the HMD wearer. In a dynamic gesture instruction such as that shown in FIG. 9, a feature shape is not necessary as determination criteria as in a static gesture instruction and only an execution position is necessary. For example, the determination criteria may conceivably be that after one of the hands in the screen detected by the detection unit 103 comes into contact with the start point P1 of the arrow, the hand maintains a certain distance from a line segment P1-P2 and subsequently comes into contact with the end point P2 of the arrow. While a determination of contact by the comparison unit 105 necessitates a position and time to be determined, for example, a conceivable determination method determines that contact is made when the position of the index finger stays within a radius of 3 cm from P1 in the virtual space for 0.1 seconds (3 frames at 30 frames/second). This is represented as a schematic view in FIG. 10. Black circles denote the start point P1 and the end point P2 and white circles denote a group of positions Qn=Q1, Q2, Q3, . . . of the index finger of the HMD wearer recorded for each frame. In addition, Qn from contact with P1 to contact with P2 is represented by a bold white circle. In FIG. 10, Q10 is a position farthest from the line segment P1-P2 among positions between when the index finger of the HMD wearer comes into contact with P1 and subsequently comes into contact with P2. In this case, whether or not the determination criteria and the detected information match can be determined by calculating a distance between the position Q10 and the line segment P1-P2 and, for example, determining whether or not the distance is within 3 cm. Although a trajectory of the line segment constituted of P1 and P2 is used as an example here, for example, an instruction to perform authentication only by coming into contact with point P1 may be adopted instead. In addition, an instruction to perform authentication using a trajectory of a polygon, a curved line, an alphabetical character, or the like by increasing points such as P3 and P4 can be adopted. Furthermore, a motion of touching a plurality of points P1, P2, . . . with a hand or a finger in a designated order may be adopted as a motion instruction. In this case, a distance between the point Qn and a line segment need not be evaluated and, instead, whether or not contact is made with a next point Pm+1 within a predetermined amount of time after contact is made with a point Pm may be evaluated. The simpler the authentication, the easier it is to implement, and the more complex the authentication, the more secure. According to the present motion instruction, since the HMD wearer need not express a feature shape and only needs to move a hand, authentication can be executed more intuitively. A feature of a dynamic gesture is a small burden to define determination criteria since not only is the dynamic gesture less of a burden on the HMD wearer but also does not involve comparing feature shapes.

Third Embodiment

Figure 11:
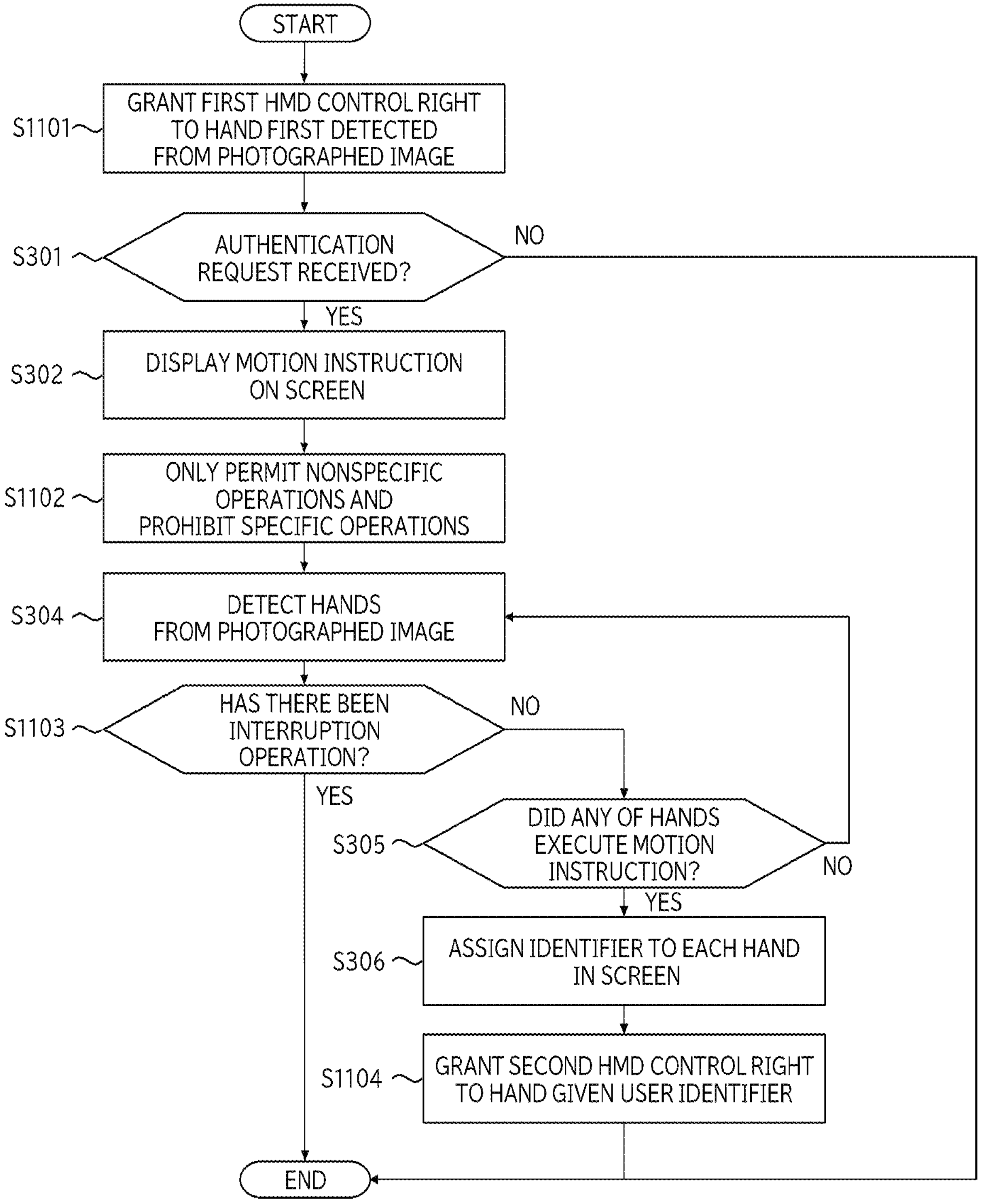
FIG. 11 is a flow chart of authentication processing of a hand of an HMD wearer according to a third embodiment.

While a gesture authentication is performed during startup of the HMD 10 in the first embodiment, performing a gesture authentication at every startup is secure but also increases authentication frequency. In a third embodiment, an example of granting an HMD control right by a different method during startup of the HMD 10 and performing gesture authentication only for a part of operations will be described. FIG. 11 is a flow chart of authentication processing of a hand of an HMD wearer according to the third embodiment. Hereinafter, a detailed description of same portions as the first embodiment will not be repeated and feature portions of the third embodiment will be mainly explained.

In the present embodiment, operations with respect to the HMD 10 are classified into a plurality of categories (levels) in advance according to a level of security risk (in other words, criticality (lethality) when a misoperation occurs). For example, in the following example, operations are classified into operations of a first category (also referred to as "nonspecific operations") with a low security risk and operations of a second category (also referred to as "specific operations") with a security risk that is higher than the first category. In addition, a necessary HMD control right is separated for each category (level), and the need for authentication is set for each HMD control right.

In step S1101, the detection unit 103 detects hands from an image photographed by the imaging unit 101 and grants a first HMD control right to a hand detected first. The first HMD control right is a right to perform only operations belonging to the first category (nonspecific operations) with low security risk. Granting the first HMD control right without performing hand authentication allows the HMD wearer to perform nonspecific operations without the hassle of performing authentication, thereby providing excellent usability. Although there is a risk of an occurrence of misoperations by others, since nonspecific operations are operations with a low security risk, the occurrence of misoperations by others will not lead to a fatal problem.

In step S301, the instruction unit 104 determines whether or not an authentication request has been received. When the instruction unit 104 has received an authentication request, the flow advances to step S302, but if not, the flow is ended without further continuation. Let us assume a case where an authentication request is issued when an HMD wearer tries to make a financial transaction using the user interface in the virtual space with an application in the HMD 10. Since a financial transaction requires high security, operations related to a financial transaction are set to specific operations and can only be operated by a hand with the second HMD control right. The second HMD control right is a right that enables specific operations to be performed.

In step S302, the HMD 10 issues a motion instruction to the HMD wearer. Here, the same motion instruction as in the first embodiment is assumed.

Figure 12:
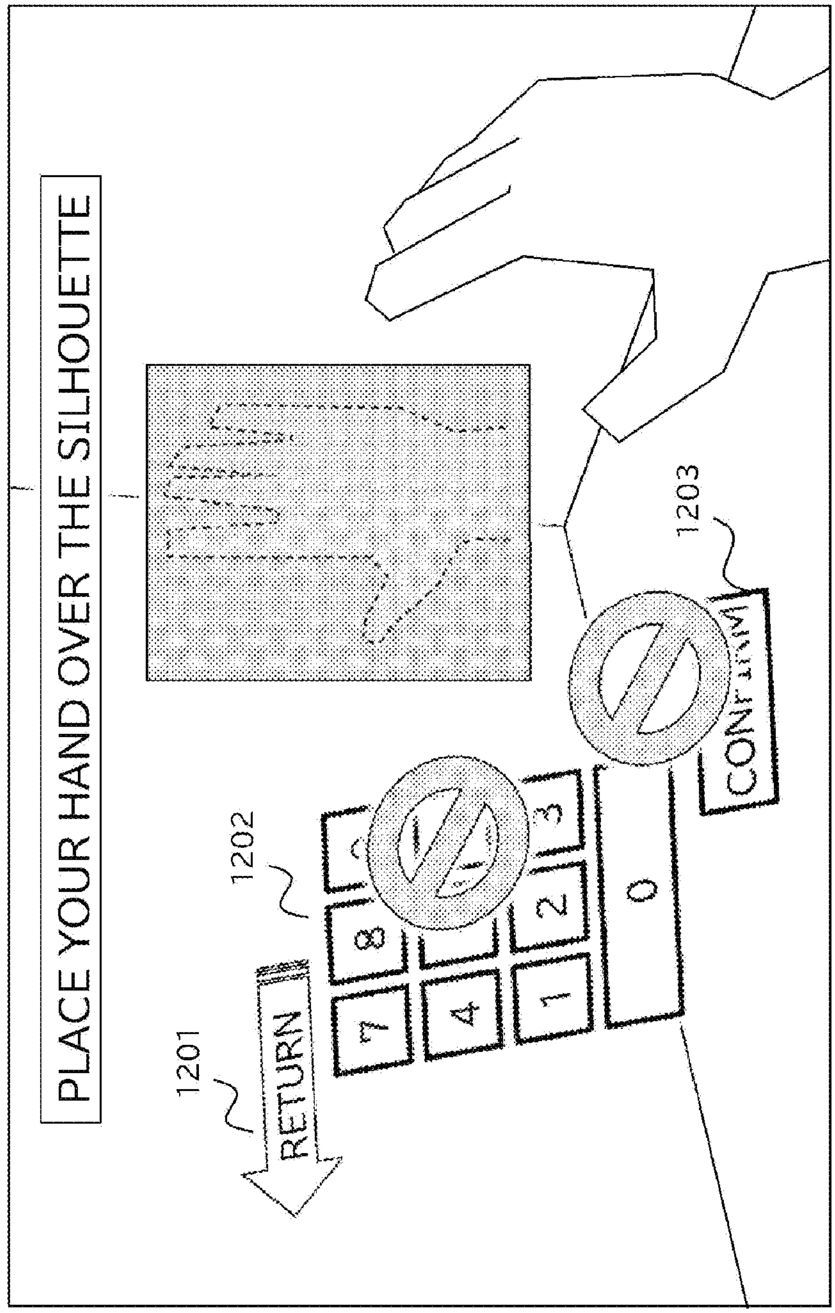
FIG. 12 shows a composite image at S1102 in the third embodiment.

In step S1102, the control unit 107 permits only nonspecific operations among the operations of the HMD 10 and prohibits input of specific operations. FIG. 12 is an example of a composite image displayed on the HMD 10 in step S1102 according to the third embodiment. A return button 1201 is a user interface in the virtual space that cancels a financial transaction when touched by a hand with the first HMD control right. An amount input button 1202 is a user interface in the virtual space for entering an amount of money when touched by a hand with the second HMD control right. A confirm button 1203 is a user interface in the virtual space for completing the amount entry and executing a transaction when touched by a hand with the second HMD control right. In other words, while a hand with the first HMD control right can operate the return button 1201, the hand cannot operate the amount input button 1202 and the confirm button 1203.

In step S304, the detection unit 103 detects hands from an image photographed by the imaging unit 101.

In step S1103, the control unit 107 determines whether or not there has been an interruption operation of gesture authentication. Here, an operation of the return button 1201 performed by a hand with the first HMD control right is determined as an interruption operation. When there has been an interruption operation, the flow is ended without further continuation, but when there has not been an interruption operation, the flow advances to step S305.

In steps S305 to S306, the HMD 10 performs gesture authentication and assigns an identifier. In step S1104, the control unit 107 grants the second HMD control right to the hand of the HMD wearer. Accordingly, the HMD wearer can perform specific operations such as operations of the amount input button 1202 and operations of the confirm button 1203 and becomes capable of performing financial transactions.

Performing the series of processing described above enables the first HMD control right that is only allowed nonspecific operations to be granted during startup of the HMD 10 and enables gesture authentication to be performed only when specific operations are required. According to the present embodiment, while gesture authentication is not performed in basic operations with low security risk, gesture authentication is performed only in situations with high risk of misoperation by others such as financial transactions. This allows security to be ensured while reducing the burden on the user to perform gesture authentication.

Fourth Embodiment

In the first to third embodiments, gesture authentication is performed when the instruction unit 104 receives an authentication request. However, the HMD 10 must also authenticate when the hand of the HMD wearer is out of the angle of view of the imaging unit 101 or when the hand of the HMD wearer is hidden by a shielding object and the HMD 10 can no longer detect the hand (when the HMD 10 loses sight of the hand), which may result in frequent gesture authentication. In the fourth embodiment, an example of omitting gesture authentication by using past authentication results will be described. Accordingly, after the HMD 10 loses sight of the hand of the HMD wearer, gesture authentication can be omitted when the hand once again enters the angle of view of the imaging unit 101.

Figure 13:
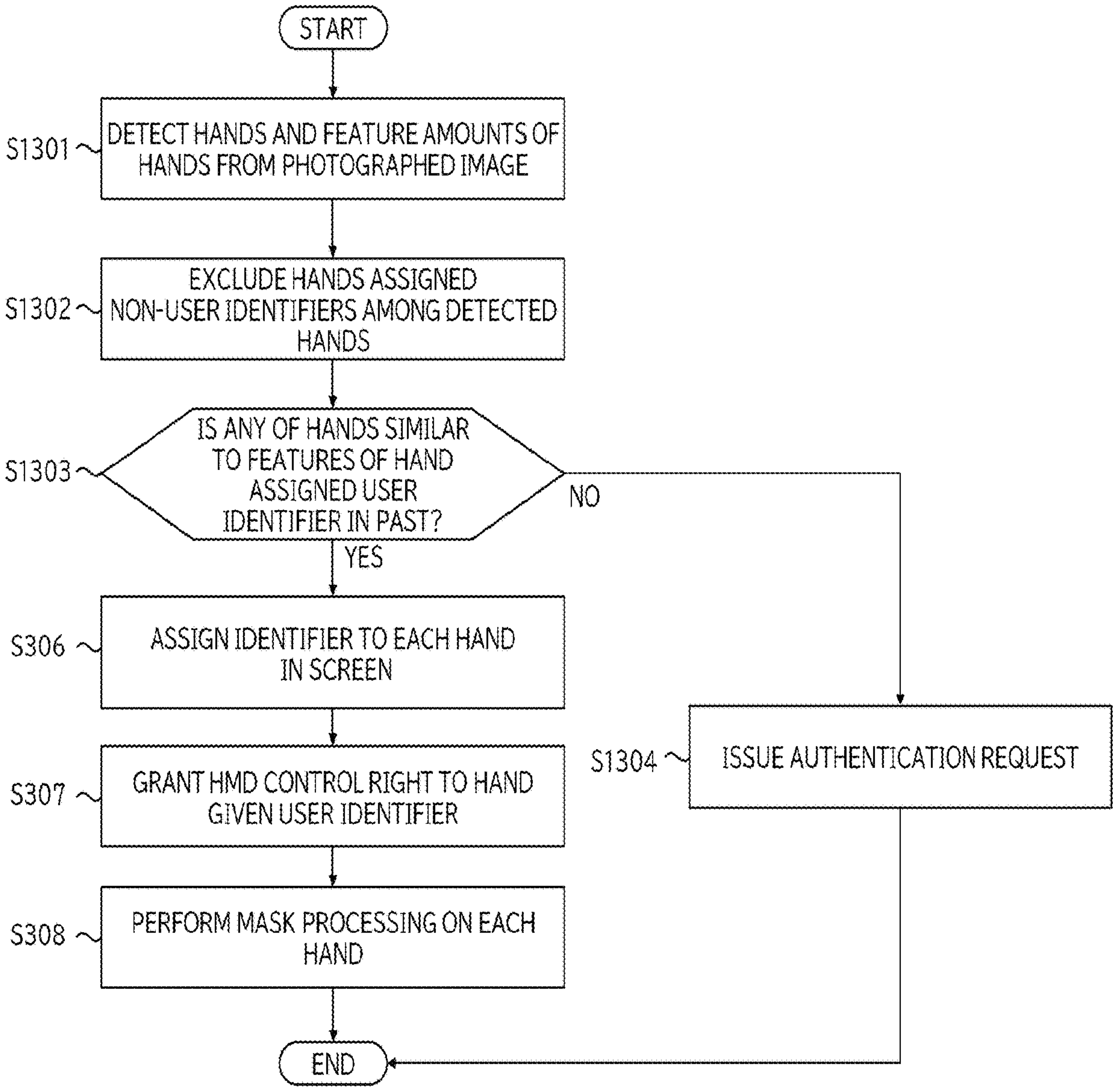
FIG. 13 is a flow chart of authentication processing of a hand of an HMD wearer according to a fourth embodiment.

FIG. 13 is a flow chart of authentication processing of a hand of an HMD wearer according to a fourth embodiment. Hereinafter, a detailed description of same portions as the first embodiment will not be repeated and feature portions of the fourth embodiment will be mainly explained.

Here, let us assume a situation where a plurality of hands were detected in previous authentication processing, one of the hands was assigned a user identifier and the remaining hands were assigned a non-user identifier, but subsequently, the hand assigned the user identifier ceased to be detected and the control right for the HMD was invalidated.

In step S1301, the detection unit 103 performs detection of a feature amount of a hand using the photographed image received from the imaging unit 101. In this case, the feature amount refers to, for example, a color, a size, a length, a thickness, a shape, or the like of the hand or finger of the HMD wearer. The feature amount of the hand acquired by the detection unit 103 is stored in the hand information storage unit 109 and processing is advanced to step S1302.

In step S1302, if a hand having been assigned a non-user identifier in the previous authentication processing is included in the hands detected in the photographed image, the hand assigned the non-user identifier is excluded from a comparison object in a next step S1303. In other words, hands that are known to belong to others are excluded from objects of the authentication processing. For example, if N-number of hands are detected from the photographed image and M-number of hands among the N-number of hands have been assigned non-user identifiers, only (N-M)-number of hands of which identifiers are unknown are to be used in the authentication processing from step S1303 onward.

In step S1303, using the detected information stored in the hand information storage unit 109 which is stored in step S1301, a determination is made as to whether or not any of the detected hands have feature amounts similar to those of a hand to which a user identifier was assigned in the past. When there is a similar hand, processing advances to step S306. When there are no similar hands, processing advances to step S1304.

Figure 14:
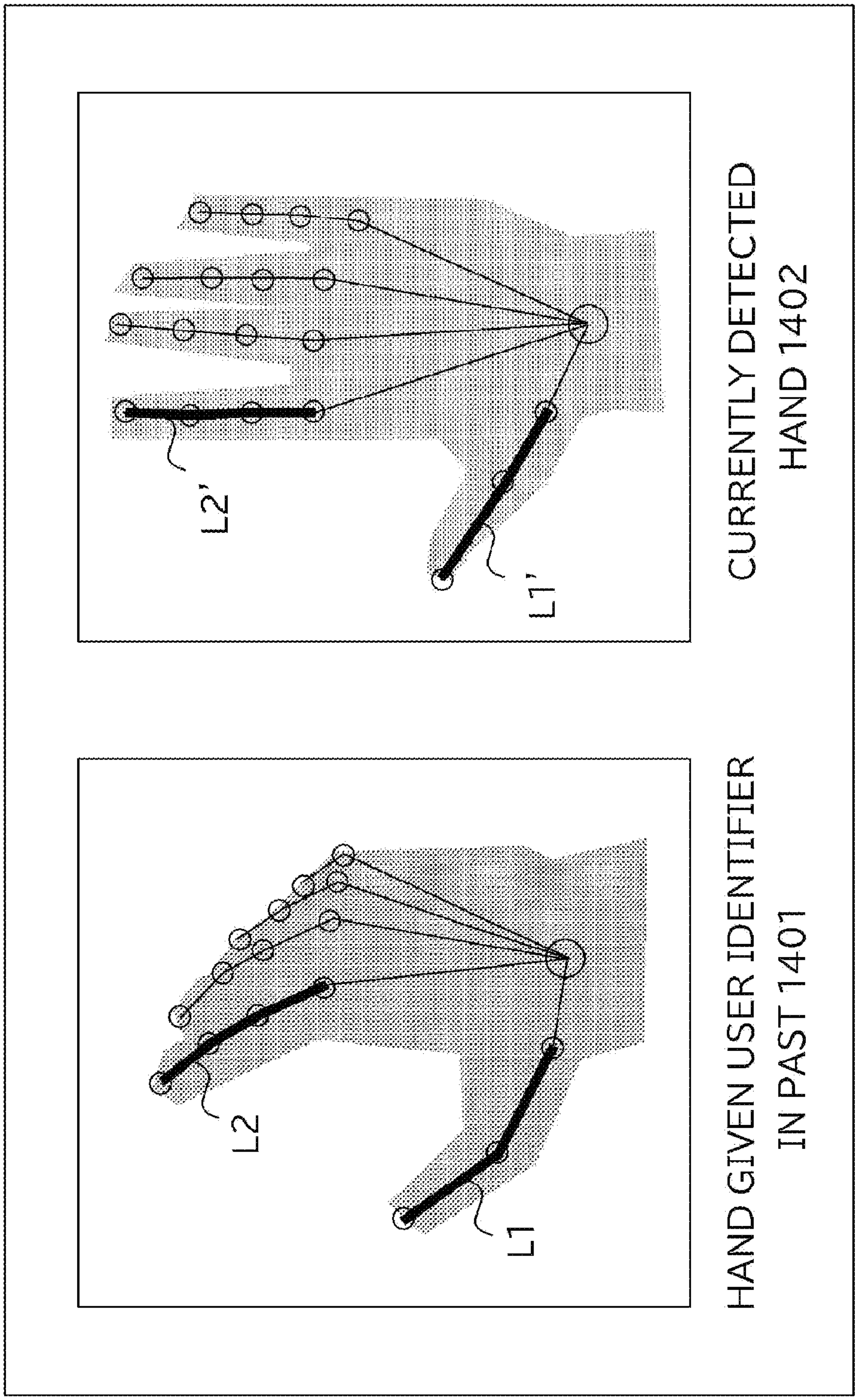
FIG. 14 shows user estimation based on detected information.

A comparison between a feature amount of a hand that has been assigned a user identifier in the past and a feature amount of a hand that is currently being detected may be performed in any way. In general, a feature amount is defined as a scalar or a multidimensional vector and a similarity between feature amounts is defined as an inverse of a difference between scalars, an inverse of a distance between vectors, or the like. For example, hands or fingers may be simply determined to be similar when their color similarity is equal to or greater than a threshold. Otherwise, for example, as shown in FIG. 14, a finger ratio (L1/L2, L1'/L2') between a first finger length and a second finger length of a hand 1401 and a hand 1402 may be calculated, and the hands may be determined to be similar when the similarity of the finger ratios is equal to or greater than a threshold. In this case, the more stringent the similarity determination or, in other words, the higher the similarity threshold, the higher the authentication frequency and the higher the security. Conversely, the more lenient the determination or, in other words, the lower the similarity threshold, the lower the security.

In steps S306 to S308, user identifiers are given to hands with features similar to those of the hand with the user identifier and non-user identifiers are given to other hands. In addition, an HMD control right is regranted to the hands given user identifiers and mask processing is performed.

On the other hand, in step S1304, the control unit 107 issues an authentication request and a flow corresponding to the first embodiment is executed. In other words, when hands with features similar to those of the hand with the user identifier are not found, gesture authentication is to be performed.

Performing the series of processing described above and using the results of past gesture authentication enables the flow to be simplified. According to the present embodiment, even when the HMD 10 loses sight of a hand, the HMD wearer can omit re-authentication by a gesture. In addition, excluding hands given non-user identifier from comparison enables unnecessary authentication processing to be reduced while reducing the risk of erroneous authentication.

While a comparison with past data stored in the hand information storage unit 109 is performed in the processing of step S1303, how far back to go for data to be comparison objects can be arbitrarily designed according to the purpose. For example, if the purpose is to ignore (rescue) the fact that the hand of the HMD wearer is temporarily out of the angle of view or hidden by a shielding object, time may be set to be as short as several tens of milliseconds to several tens of seconds. The shorter the time, the higher the security. Alternatively, if it is known in advance that a specific user will continuously use the HMD 10 for a predetermined amount of time (for example, when providing a 10-minute XR experience to a customer), the time may be set more or less equal to the scheduled time of use. Accordingly, performing gesture authentication only once when wearing the HMD enables the user to continue using the HMD while the HMD control right remains validated for a predetermined period of time (regardless of whether or not the hand is out of the angle of view or hidden). Alternatively, no time limit could be set. In other words, all the feature amounts and user identifiers of hands of users subjected to gesture authentication in the past are to be registered and stored. Such a setting is useful when applications and users of the HMD 10 are limited to some extent and the same users are expected to use the HMD 10 repeatedly (for example, when only family members use it in the home). How old can data be for comparison (in other words, how long the retention period should be before a stored user identifier is discarded) may be set in advance in the HMD 10 or the user may be able to change the setting.

Fifth Embodiment

Figure 15:
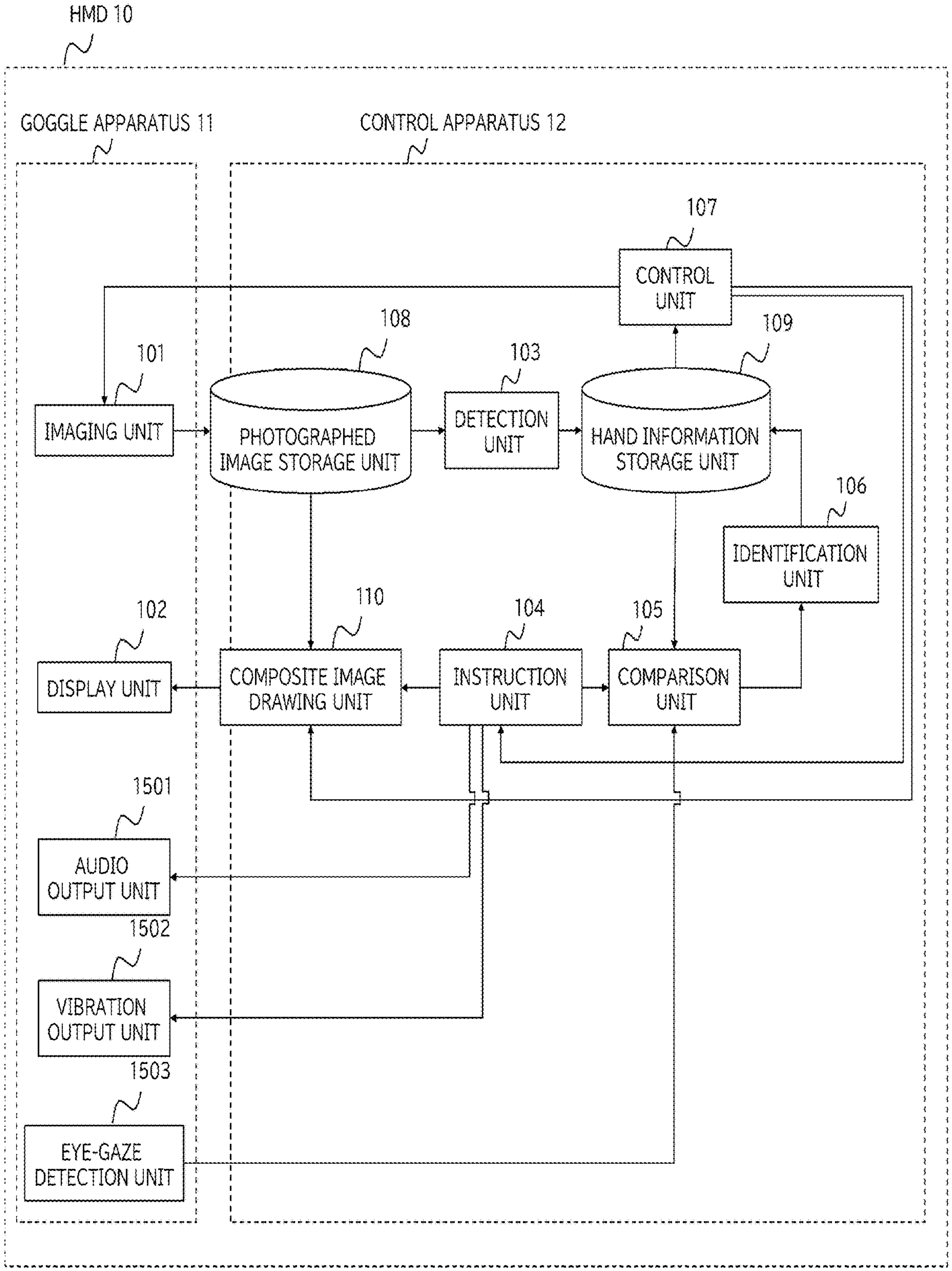
FIG. 15 shows a configuration of an HMD according to a fifth embodiment.

The first to fourth embodiments described a method of authenticating an HMD wearer using the imaging unit 101 and the display unit 102. However, the HMD 10 can be installed with other input/output means to provide more flexible motion instructions and authentication methods. A case where components are added to FIG. 1 will be described in the fifth embodiment. FIG. 15 is a block diagram showing a configuration of an HMD according to the fifth embodiment. Note that a flow chart is similar to that of the first embodiment.

An audio output unit 1501 is fixed to the housing of the goggle apparatus 11 and outputs audio that can be heard by the HMD wearer. Audio is preferably output at a low volume from a position close to the ears of the HMD wearer as in the case of earphones or headphones, output in a directional manner, or output using bone conduction so that only the HMD wearer can hear the audio.

A vibration output unit 1502 is fixed to the housing of the goggle apparatus 11 and outputs vibration that can be perceived by the HMD wearer. A vibration that does not generate sound is preferably used so that only the HMD wearer can perceive the vibration.

An eye-gaze detection unit 1503 is fixed to the housing of the goggle apparatus 11 and, after photographing the eyes of the HMD wearer and a periphery thereof, detects an eye-gaze. However, structures may be separated for eye photography and eye-gaze detection and detection processing may be performed by the control apparatus 12.

Using the components described above enables motion instructions to be issued more flexibly in step S302 in FIG. 3.

Figure 16:
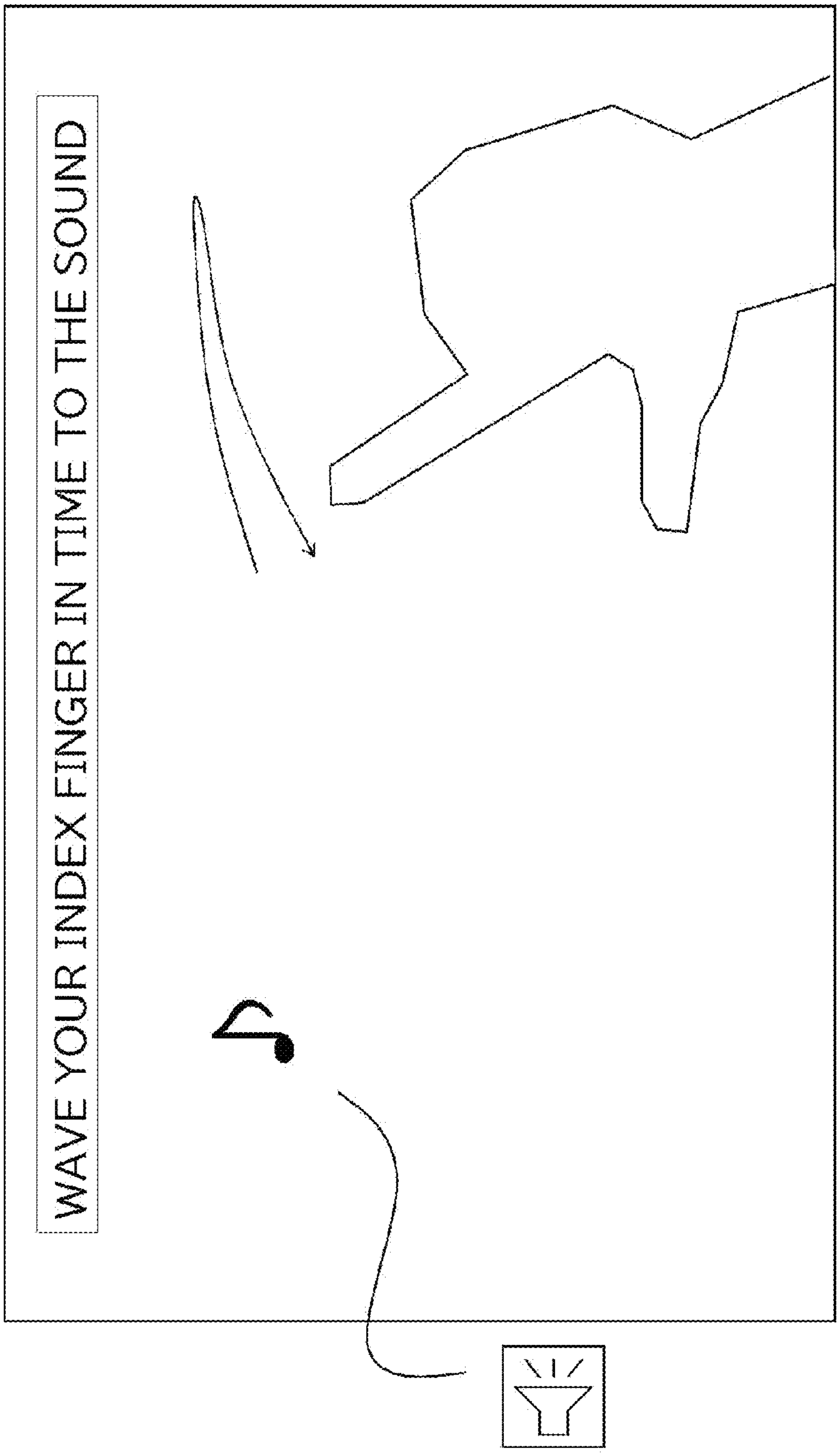
FIG. 16 shows a composite image when displaying a dynamic gesture instruction using audio output.

For example, FIG. 16 shows a dynamic gesture instruction that instructs a hand or a finger to be moved in time with the timing of the audio output. Conceivable determination criteria in this case are a state where a change in position of the index finger is close to the timing of audio output. Specifically, whether or not the determination criteria match the detected information can be determined by calculating an amount of change in the position of the index finger with respect to time and comparing whether or not a cycle of an amount of change in position is close to the audio output timing. When the audio output by the audio output unit 1501 is inaudible to surrounding people, as with displaying motion instructions on the screen, no one other than the HMD wearer can execute the motion instructions. Therefore, the hand having executed the motion instruction can be authenticated as a hand of the HMD wearer. Note that this example is also valid when the audio is replaced by the vibration output by the vibration output unit 1502.

According to the present motion instruction, by issuing a motion instruction using audio or vibration, the motion instruction is less likely to occupy the screen compared to instructions using images and enables the hand of the HMD wearer to be authenticated with a clear field of vision.

Figure 17:
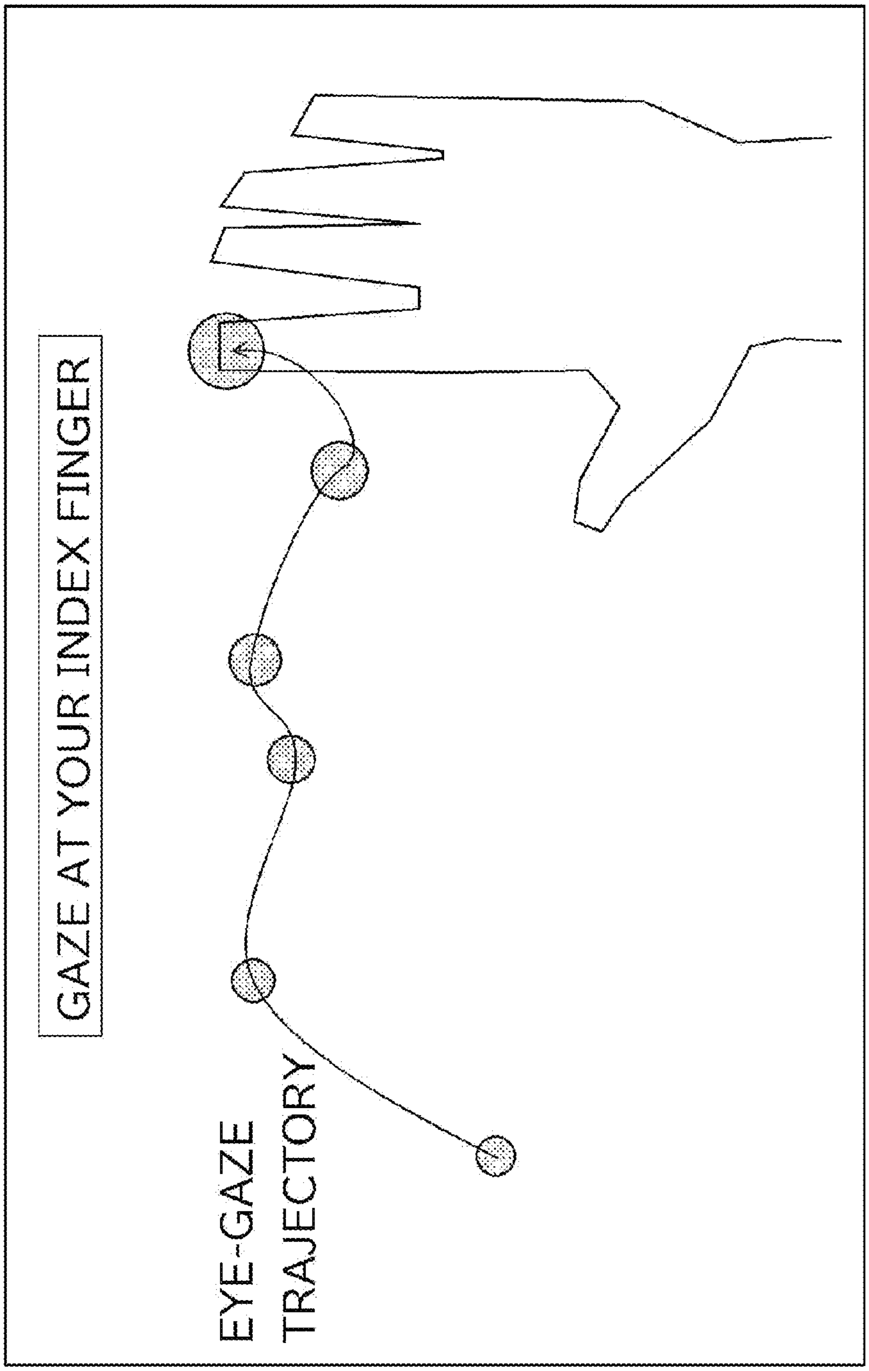
FIG. 17 shows a composite image when displaying a dynamic gesture instruction using eye-gaze detection.

In addition, FIG. 17 shows an example of a dynamic gesture instruction to move a hand or finger in coordination with an eye-gaze motion. For example, a position of the hand or finger to be gazed at is indicated by an instruction such as "Gaze at your index finger" and authentication is performed on the basis of whether or not the position of the hand or finger and the gaze coincide within a predetermined time. Since the position coordinates of the eye-gaze trajectory detected by the eye-gaze detection unit 1503 serve as the determination criteria, whether or not the determination criteria and the detected information match can be determined by comparing the position coordinates of the eye-gaze trajectory with the position coordinates of the index finger. At this point, since the eye-gaze of the HMD wearer cannot be seen from outside of the HMD or, in other words, no one other than the HMD wearer can execute the motion instruction, the hand having executed the motion instruction can be authenticated as a hand of the HMD wearer.

According to the present motion instruction, since using eye-gaze detection as a motion instruction enables the HMD wearer to move his/her hand or fingers according to the instruction while issuing the motion instruction himself/herself, the hand of the HMD wearer can be authenticated more intuitively. While the position to be gazed at is instructed by a message in the example shown in FIG. 17, alternatively, the instruction may be output by audio. In addition, the position to be gazed at may be other than a fingertip. For example, an intersection of the palm of a hand or the entire hand with a gaze may be determined or an instruction to gaze at a plurality of positions on the hands or fingers such as "Look at your left hand after gazing at your right hand" may be issued. Both methods involve the HMD wearer himself/herself coordinating his/her eye-gaze with the motion of his/her hands or fingers and realizes authentication with intuitive motion.

Other Embodiments

The embodiments described above are merely examples of preferred configurations of the present disclosure and the scope of the present disclosure is not limited to the configurations of the embodiments. For example, the configurations of the first to fifth embodiments may be combined with each other as long as no technical contradictions arise.

For example, the following may be adopted as motion instructions.

- Draw a figure on an image displayed on the display unit 102 and have a finger or a hand touch the figure.
- Draw a plurality of figures on an image displayed on the display unit 102 and have a plurality of fingers simultaneously touch the plurality of figures.
- Draw a plurality of figures on an image displayed on the display unit 102 and have a hand or a finger touch the plurality of figures in sequence.
- Sequentially draw figures at different positions on an image displayed on the display unit 102 and have a hand or a finger touch the figures in sequence.
- Output an instruction such as "Raise your thumb to make a thumbs-up gesture" or "Extend your index and pinky fingers only" using an image or audio to have a hand or a finger change into a designated shape.
- The user registers an authentication motion to the HMD 10 in advance (only the user is supposed to know the authentication motion). Then, an HMD wearer is prompted to perform the motion without indicating the specific contents of the motion by an instruction such as "Perform the authentication motion", and if the HMD wearer is able to perform the same motion as the authentication motion, a hand of the HMD wearer is authenticated as a hand of a legitimate user.

Note that the above-described various types of control may be processing that is carried out by one piece of hardware (e.g., processor or circuit), or otherwise. Processing may be shared among a plurality of pieces of hardware (e.g., a plurality of processors, a plurality of circuits, or a combination of one or more processors and one or more circuits), thereby carrying out the control of the entire device.

Also, the above processor is a processor in the broad sense, and includes general-purpose processors and dedicated processors. Examples of general-purpose processors include a central processing unit (CPU), a micro processing unit (MPU), a digital signal processor (DSP), and so forth. Examples of dedicated processors include a graphics processing unit (GPU), an application-specific integrated circuit (ASIC), a programmable logic device (PLD), and so forth. Examples of PLDs include a field-programmable gate array (FPGA), a complex programmable logic device (CPLD), and so forth.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, an HMD wearer's own hand can be simply and securely authenticated from among hands included in a field of view of the HMD.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-150851, filed Sep. 2, 2024, which is hereby incorporated by reference herein in its entirety.

What is claimed is:

1. A control apparatus of a head-mounted display (HMD) comprising: an image sensor configured to capture a field of view of a wearer; and a display configured to show an image to the wearer, wherein the control apparatus is configured to give a motion instruction that prompts the wearer to perform a motion to be executed using a hand or finger, and in a case where it is determined that a plurality of hands detected from a captured image obtained by the image sensor are performing a motion according to the motion instruction, authenticate a hand performing a motion closest to a motion according to the motion instruction among the plurality of hands as a hand of the wearer.

2. The control apparatus according to claim 1, configured to grant a control right of the HMD to the hand authenticated as a hand of the wearer among the plurality of hands and to not grant a control right of the HMD to a hand not authenticated as a hand of the wearer among the plurality of hands.

3. The control apparatus according to claim 1, configured to display an image in which the hand authenticated as a hand of the wearer is drawn in a mode that distinguishable from hands of others on the display.

4. The control apparatus according to claim 1, wherein the motion instruction includes an instruction to express a designated shape using a hand or finger.

5. The control apparatus according to claim 1, wherein the motion instruction includes an instruction to move a hand or finger to a designated position.

6. The control apparatus according to claim 1, wherein the motion instruction includes an instruction to move a hand or finger along a designated trajectory or according to a designated order.

7. The control apparatus according to claim 1, wherein the motion instruction includes an instruction to move a hand or finger in coordination with an eye-gaze motion.

8. The control apparatus according to claim 1, configured to change capturing condition in a case where the image sensor captures an image for detecting hands according to a type of the motion instruction to be given to the wearer.

9. The control apparatus according to claim 1, configured to give the motion instruction to the wearer by a method involving displaying an image expressing the motion instruction on the display.

10. The control apparatus according to claim 1, wherein the HMD further includes outputting interface configured to output audio and/or vibration to the wearer, and the control apparatus is configured to give the motion instruction to the wearer by a method involving outputting contents of the motion instruction by audio and/or vibration using the outputting interface.

11. The control apparatus according to claim 1, wherein operations with respect to the HMD are classified into a plurality of categories, and the control apparatus is configured to enable an operation by a hand not authenticated as a hand of the wearer with respect to operations of a first category among the plurality of categories and enable an operation only by the hand authenticated as a hand of the wearer with respect to operations of a second category that differs from the first category, among the plurality of categories.

12. The control apparatus according to claim 11, wherein operations of the second category are operations with a higher security risk than operations of the first category.

13. The control apparatus according to claim 1, configured to assign a user identifier and grant a control right of the HMD to the hand authenticated as a hand of the wearer and to validate the control right of the HMD until the hand assigned the user identifier is no longer detected from a captured image obtained by the image sensor.

14. The control apparatus according to claim 13, configured to invalidate the control right of the HMD once the hand assigned the user identifier is no longer detected from a captured image obtained by the image sensor.

15. The control apparatus according to claim 14, configured, in a case where after the hand assigned the user identifier is no longer detected from a captured image obtained by the image sensor, a hand similar to the hand assigned the user identifier is detected from a captured image obtained by the image sensor, to reassign the user identifier and regrant the control right of the HMD to the detected hand without performing authentication by the motion instruction.

16. A control method of a head-mounted display (HMD) including: an image sensor configured to capture a field of view of a wearer; and a display configured to show an image to the wearer, wherein the control method comprising:

giving a motion instruction that prompts the wearer to perform a motion to be executed using a hand or finger; and in a case where it is determined that a plurality of hands detected from a captured image obtained by the image sensor are performing a motion according to the motion instruction, authenticating a hand performing a motion closest to a motion according to the motion instruction among the plurality of hands as a hand of the wearer.

17. A non-transitory computer readable medium that stores a program, wherein the program causes a computer to execute a control method of a head-mounted display (HMD) comprising: an image sensor configured to capture a field of view of a wearer; and a display configured to show an image to the wearer, wherein giving a motion instruction that prompts the wearer to perform a motion to be executed using a hand or finger, and in a case where it is determined that a plurality of hands detected from a captured image obtained by the image sensor are performing a motion according to the motion instruction, authenticating a hand performing a motion closest to a motion according to the motion instruction among the plurality of hands as a hand of the wearer.

* * * * *